Patented Oct. 31, 1939

2,177,757

UNITED STATES PATENT OFFICE 2,177,757

PHOSPHORIC ACID ESTERS OF NITROALCOHOLS

Byron M. Vanderbilt, Terre Haute, Ind., assignor to Commercial Solvents Corporation, Terre Haute, Ind., a corporation of Maryland No Drawing. Application May 19, 1938, Serial No. 208,879

5 Claims. (Cl. 260—461)

My invention relates to new phosphoric acid esters of aliphatic nitroalcohols and the methods of producing same. More particularly, it pertains to the tertiary phosphoric acid esters of aliphatic nitroalcohols.

My new phosphoric acid esters of aliphatic nitroalcohols may be represented by the following structural formula:

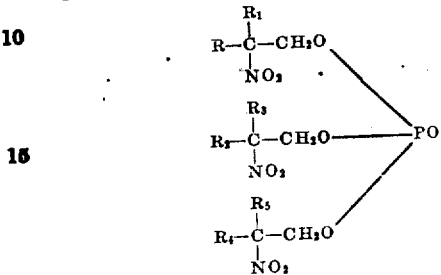

in which R, $R_1$, $R_2$, $R_3$, $R_4$, and $R_5$ may be either an alkyl or H. All of the R's may be the same alkyl and the corresponding R on each carbon atom may be the same alkyl but different from that represented by the other R attached to the same carbon atom in cases where this second R represents an alkyl instead of an H.

The phosphoric acid esters of the aliphatic nitroalcohols are preferably produced by reacting an aliphatic nitroalcohol with phosphorus oxychloride, or with phosphorus pentachloride followed by subsequent treatment with water and suitable methods of obtaining them by both of these means are described below, but it is understood, of course, that my invention is not limited to these particular procedures.

The tertiary phosphoric acid esters of primary aliphatic alcohols have usually been prepared by reacting an excess of the aliphatic alcohol with phosphorus oxychloride at low temperatures to produce the di-substitution products, followed by heating at relatively elevated temperatures to produce the tri-substituted product. In such processes it has customarily been necessary to carry out the operation in such a manner as to remove from the zone of the reaction the by-product hydrogen chloride as it is formed in order to prevent it from entering into various undesirable side reactions. The initial stage of the reaction, as has previously been indicated, must be effected at low temperatures in order to reduce the tendency toward the formation of undesired products, and recently it has been discovered that by similarly carrying out the second stage of the reaction at low temperatures over longer periods of time, improved results are obtained in the form of better yields of the desired products.

I have now discovered that while the primary aliphatic nitroalcohols do not ordinarily react with phosphorus oxychloride, even at room temperature, whereas corresponding aliphatic alcohols react with violence at sub-zero temperatures, reaction may be effected at temperatures of about 50° C. and above, although even at more elevated temperatures complete reaction is difficult to effect, the third chlorine of the phosphorus oxychloride being quite unreactive toward such nitroalcohols.

A more satisfactory method of producing the phosphoric acid esters of the aliphatic nitroalcohols is by reacting the latter with phosphorus pentachloride. While the mechanism of the reaction is not definitely known, it apparently proceeds as follows: $ROH + PCl_5 \rightarrow (RO)PCl_4 + HCl$. Where three or more moles of the nitroalcohol are present $(RO)_3PCl_2$, and perhaps even $(RO)_4PCl$ and/or $(RO)_5P$, may be formed. When any one of the last three compounds is treated with water, a tertiary phosphate, $(RO)_3PO$, is formed and hydrogen chloride and/or the nitroalcohol is liberated.

The following specific examples illustrate suitable methods of obtaining my new phosphoric acid esters of primary aliphatic nitroalcohols:

Example I

One mole of 2-methyl-2-nitro-1-butanol (133 g.), 0.2 mole of phosphorus oxychloride (30.6 g.) and 135 g. of anhydrous carbon tetrachloride were placed in a reaction vessel equipped with a reflux condenser. On heating the reaction mixture the evolution of the hydrogen chloride began as the boiling point of the carbon tetrachloride was reached and the reaction was continued by maintaining the reaction mixture in a state of mild reflux, i. e., 74–76° C. At the end of 2½ hours' refluxing, the evolution of hydrogen chloride had practically ceased. The carbon tetrachloride was then distilled from the reaction mixture and the residue finally heated to 140° C. and then subjected to vacuum distillation to remove any unreacted 2-methyl-2-nitro-1-butanol. The residue left in the distillation kettle after heating to 150° C. at 10 mm. constituted 81.5 g. of a cherry red liquid, which was dissolved in ether and washed with water. The ether layer was next washed with sodium bicarbonate solution and after the evolution of carbon dioxide, due to the presence of any acid bodies resulting from incomplete esterification of a part of the phosphorus oxychloride, was complete, washed with water until neutral, and finally dried with anhydrous calcium chloride and decolorized with activated carbon. After evaporation of the ether, 24.5 g. of practically colorless liquid was obtained which constituted a 28% yield of tertiary phosphate of 2-methyl-2-nitro-1-butanol, based on the phosphorus oxychloride.

*Example II*

A solution of 240 g. of 2-methyl-2-nitro-1-butanol (1.8 mole) and 150 g. of anhydrous carbon tetrachloride was placed in a reaction vessel provided with a reflux condenser, the reaction mixture cooled to 10° C. and the pressure in the reaction vessel reduced to 100–150 mm. of mercury. To the reaction mixture was then slowly added 62.5 g. of phosphorus pentachloride (0.3 mole) over a period of approximately 2 hours. Reaction of the phosphorus pentachloride with the nitroalcohol was very vigorous, all of the solid going into solution at this temperature. The reaction mixture was then slowly heated to the reflux temperature of the carbon tetrachloride, i. e., 44–45° C. After a relatively short period of time at this temperature, the evolution of hydrogen chloride ceased. The contents of the reaction vessel were then poured into water and thoroughly mixed. The oil layer was separated and washed with sodium bicarbonate solution. After washing until neutral, the carbon tetrachloride was removed by distilling at atmospheric pressure, followed by removal of the unreacted 2-methyl-2-nitro-1-butanol by distillation at 2 mm. of mercury. The residue was a light yellow viscous liquid which was easily decolorized by activated carbon giving a yield of 130 g. of pure tertiary phosphate of 2-methyl-2-nitro-1-butanol, i. e. 99% of theory. If desired, this product can be crystallized by precipitation with petroleum ether from its absolute alcohol solution at approximately 0° C. Crystallization, however, ordinarily is not necessary in order to obtain a reasonably pure product. The tertiary phosphate of 2-methyl-2-nitro-1-butanol melts at 23–25° C., has a specific gravity of 1.2223 at 30/4° C. and when super-cooled to 20° C. has a refractive index of 1.4647. It is quite stable thermally, decomposition when heating at 1 mm. of mercury not taking place appreciably until a temperature of 250° C. has been reached. It is miscible with the usual oxygenated organic solvents and aromatic hydrocarbons; it is immiscible with water and only very slightly soluble in petroleum naphtha. On account of its low volatility and its compatibility with cellulose esters, it is an excellent plasticizer for such compositions.

*Example III*

A solution of 71.5 g. (0.6 mole of 2-methyl-2-methyl-2-nitro-1-propanol in 150 cc. of anhydrous 2-nitropropane was placed in a reaction vessel equipped with a reflux condenser. To the reaction vessel while maintaining the contents thereof at a temperature of 10° C. was then slowly added 31.5 g. of phosphorus pentachloride (0.15 mole). The reaction mixture was then heated at 40° C. until evolution of the hydrogen chloride ceased. The 2-nitro-propane was evaporated under a partial vacuum and the white solid obtained slurried with water, followed by dilute sodium bicarbonate treatment and then purified by further crystallization from butanol. The theoretical yield of the tertiary phosphate of 2-methyl-2-nitro-1-propanol was obtained. This compound melts at 155° C., is quite stable thermally and is very soluble in the lower molecular weight oxygenated solvents, slightly soluble in butanol and benzol and insoluble in petroleum solvents and water.

In the specific examples described above, large excesses of the nitroalcohols have been employed. This, however, is not essential to the production of good yields of the corresponding phosphates when using phosphorus pentachloride, but due to the viscous character of the reaction product near the end of the reaction it is highly desirable to have present in the reaction mixture either a substantial excess of the nitroalcohol or else an inert solvent such as carbon tetrachloride, nitroparaffins or other similar materials which are not affected by either the reactants or the products of the reactions and from which the reaction product may be readily separated. And in cases where the nitroalcohols used are high melting solids, as 2-methyl-2-nitro-1-propanol, an inert solvent is necessary regardless of the amount of excess nitroalcohol or of the nature of the phosphating agent. It is likewise unnecessary to remove the hydrogen chloride as formed during the course of the reaction by means of vacuum or other suitable means since satisfactory results can be obtained by washing out the hydrogen chloride with water or otherwise suitably removing it from the zone of reaction prior to heating the reaction mixture substantially above the temperature at which the solution of the phosphorus pentachloride is effected.

While I have only specifically described the production of the tertiary phosphates of 2-methyl-2-nitro-1-propanol and 2-methyl-2-nitro-1-butanol, the same general procedure is applicable to the production of phosphates of other primary nitroalcohols as well as the homologs of these compounds, as for example, the tertiary phosphates of 2-nitro-1-propanol, 2-nitro-1-butanol, 2-nitro-1-pentanol, etc.

Now having disclosed my invention, what I claim is:

1. Tertiary esters of phosphoric acid of the general formula:

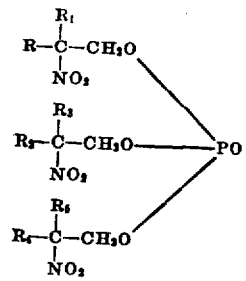

where R, $R_1$, $R_2$, $R_3$, $R_4$, and $R_5$ are members selected from the group consisting of alkyl and H.

2. Tertiary esters of phosphoric acid of the general formula:

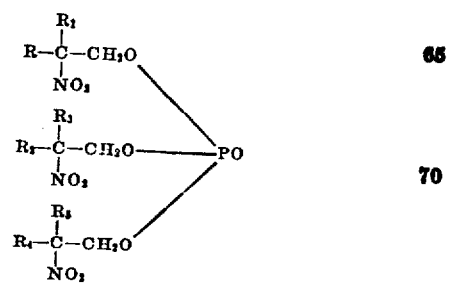

where R, R2, and R4 are the same alkyl and R1, R3, and R5 are the same alkyl which may be different from the alkyl represented by R, R2 and R4.

3. The tertiary ortho phosphate of 2-methyl-2-nitro-1-propanol.

4. The tertiary ortho phosphate of 2-methyl-2-nitro-1-butanol.

5. In a process for the production of tertiary phosphoric acid esters of primary aliphatic nitroalcohols, the steps which comprise reacting with phosphorus pentachloride a primary aliphatic nitroalcohol having the nitro group attached to the second carbon atom and treating the resulting product with water.

BYRON M. VANDERBILT.

CERTIFICATE OF CORRECTION.

Patent No. 2,177,757. October 31, 1939.

BYRON M. VANDERBILT.

It is hereby certified that error appears in the printed specification of the above numbered patent requiring correction as follows: Page 2, first column, lines 61 and 62, for "2-methyl-2-methyl-2-nitro-1-propanol" read 2-methyl-2-nitro-1-propanol; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.

where R, R₂, and R₄ are the same alkyl and R₁, R₃, and R₅ are the same alkyl which may be different from the alkyl represented by R, R₂ and R₄.

3. The tertiary ortho phosphate of 2-methyl-2-nitro-1-propanol.

4. The tertiary ortho phosphate of 2-methyl-2-nitro-1-butanol.

5. In a process for the production of tertiary phosphoric acid esters of primary aliphatic nitroalcohols, the steps which comprise reacting with phosphorus pentachloride a primary aliphatic nitroalcohol having the nitro group attached to the second carbon atom and treating the resulting product with water.

BYRON M. VANDERBILT.

CERTIFICATE OF CORRECTION.

Patent No. 2,177,757. October 31, 1939.

BYRON M. VANDERBILT.

It is hereby certified that error appears in the printed specification of the above numbered patent requiring correction as follows: Page 2, first column, lines 61 and 62, for "2-methyl-2-methyl-2-nitro-1-propanol" read 2-methyl-2-nitro-1-propanol; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)